June 19, 1945. J. GRAY 2,378,628

DISH DRAINER

Filed Aug. 31, 1944 2 Sheets-Sheet 1

Inventor
Joan Gray
By Robert Robb
Attorneys

June 19, 1945.  J. GRAY  2,378,628
DISH DRAINER
Filed Aug. 31, 1944    2 Sheets-Sheet 2

Inventor
Joan Gray
By Robert Robb
Attorneys

Patented June 19, 1945

2,378,628

UNITED STATES PATENT OFFICE 2,378,628

DISH DRAINER

Joan Gray, Cleveland, Ohio

Application August 31, 1944, Serial No. 552,083

1 Claim. (Cl. 220—20)

The object of my present invention has been to produce a simple and novel form of dish draining receptacle handy for use in connection with kitchen sinks or the like, which will support dishes in such a manner as to permit free drainage of water therefrom, maintaining the dishes separated to a large extent to avoid breakage.

My invention involves primarily the formation of the draining receptacle with drain grooves whereby the drain water may pass from the dishes to one end of the receptacle where it may pass from the receptacle to a suitable outlet.

My drainer invention is so designed that it may be made of metal, glass, rubber, or equivalent materials, and when made of metal will preferably be pressed into its ultimate form, while if made of rubber, glass, or plastic composition, it may be readily molded to its final form.

The preferred embodiments of my invention are illustrated in the accompanying drawings and described in detail in the following specification. In the drawings.

Specifically describing the construction of my drainer and referring particularly to Figures 1 to 4 of the drawings, it is noted that the receptacle of my invention comprises primarily the side walls 1 and end walls 2, the general configuration of the receptacle being rectangular. The walls 1 and 2 of the receptacle preferably slant inwardly toward the bottom of the receptacle, but they are substantially vertical as illustrated.

Figure 1:
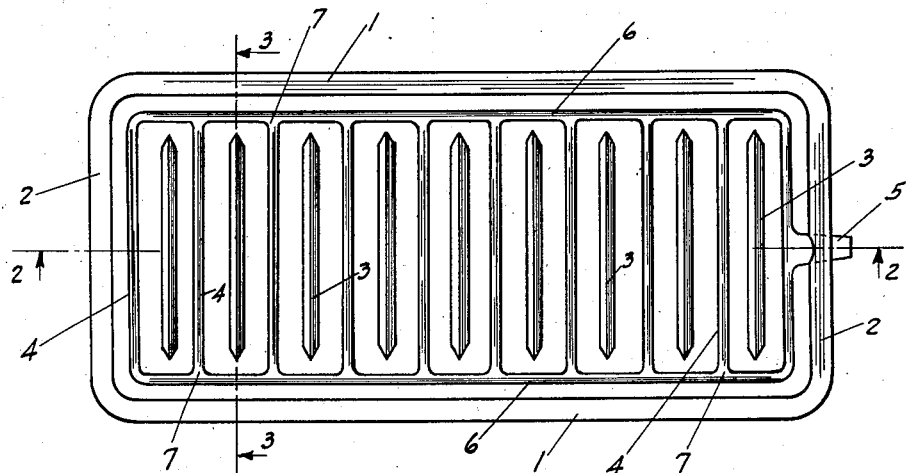
Figure 1 is a top plan view of a dish draining receptacle embodying the invention in a preferred form, in which it is made from metal.
Figure 2:
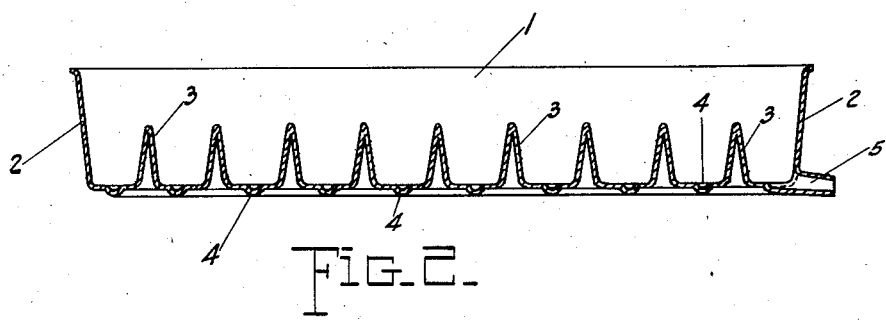
Figure 2 is a longitudinal sectional view taken about on the line 2—2 of Figure 1.
Figure 3:
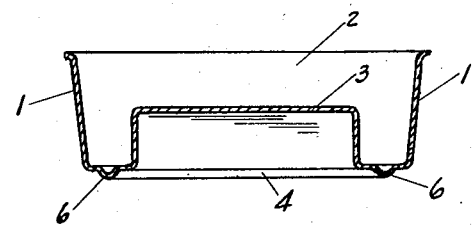
Figure 3 is a transverse sectional view taken about on the line 3—3 of Figure 1.
Figure 4:
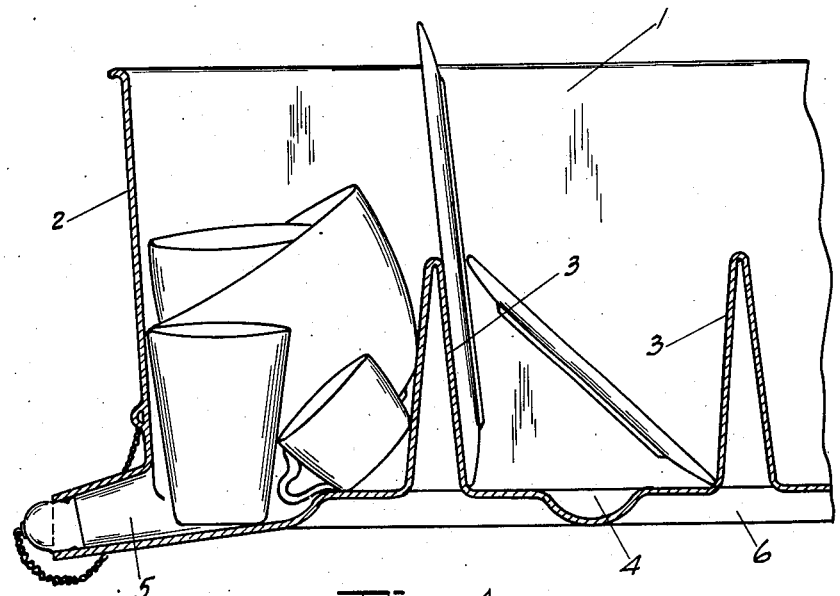
Figure 4 is an enlarged view of a fragmentary nature of an end portion of my drainer, showing the same in section and illustrating how dishes may be disposed therein for the draining operation.

The bottom of the receptacle is formed with a plurality of upwardly extending partitions 3 preferably disposed in parallel relation and spaced apart a suitable distance so that the ordinary dishes of the household may be readily positioned in draining arrangement relatively to the partitions, somewhat after the manner illustrated in Figure 4. These partitions 3 are spaced at intervals lengthwise of the receptacle and transversely disposed so as to extend nearly from side to side in the receptacle. If the drainer is made of metal, these partitions 3 may be hollow, formed by pressure dies after known manufacturing practice.

The bottom portion of the receptacle is further formed with transverse drain grooves 4, which are made by producing transverse hollow ribs pressed downwardly from the receptacle bottom. One transverse drain groove 4 is located midway between each pair of partitions 3. For carrying the drain water from the transverse drain grooves or troughs 4 to an outlet spout 5 at one end of the receptacle, I provide longitudinal hollow ribs 6 that correspondingly provide longitudinal drain grooves designated the same. At the ends thereof the transverse drain grooves 4 communicate with the longitudinal drain grooves or ribs 6 at points such as designated 7. The bottoms of the several grooves 4 and 6 are in substantially the same plane so that when the drain receptacle is slightly inclined toward the end equipped with the spout 5, drain water entering the grooves 4 will pass therefrom to the grooves 6 and ultimately drain through the spout 5 into a sink or similar place to which the drain water will be supplied. Of course, any drain water that may pass down the sides of the partitions 3 and along the upper surface of the bottom of the receptacle will likewise enter either the drain grooves 4 or 6 and ultimately flow through the spout 5 for egress from the receptacle.

Figure 5:
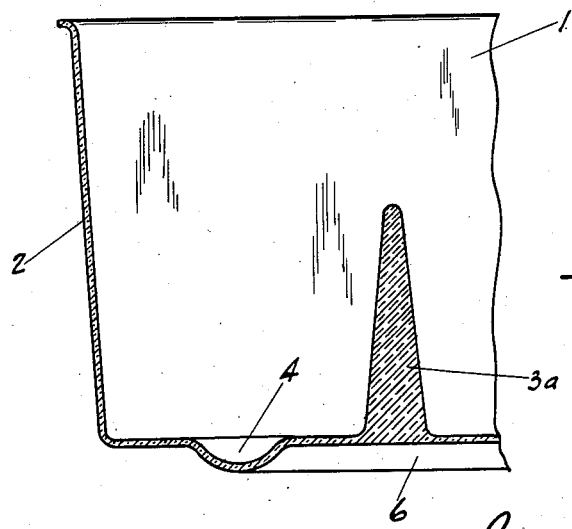
Figure 5 is a fragmentary sectional view similar to Figure 4, the dishes omitted and showing a construction of drainer as it may be produced from glass, rubber, or similar plastic material.

Figure 5 of my drawings illustrates a construction of molded drain receptacle embodying the invention, in which the partitions 3a that correspond with the partitions 3, previously described, are solid. This form of my drain receptacle will be preferably made from rubber composition, plastic, or unbreakable glass.

From the foregoing it will be seen that I have devised a most simple and compact form of drain receptacle, which can be very cheaply and readily manufactured, and in which the draining dishes or like articles may be quickly and easily emplaced and removed in the practical use of the drainer.

Having thus described my invention, what I claim as new and desire to secure by Letters Patent of the United States, is:

As a new article of manufacture, a dish draining receptacle comprising a body composed of side and end walls and a bottom, the bottom being formed with upwardly extending transverse partitions spaced apart and of sufficient height to generally support dishes in standing position therebetween, but lower than the side and end walls, said partitions terminating at their ends short of the side walls, the body bottom midway between the partitions and between the side walls and the ends of said partitions being depressed to form communicating transverse and longitudinal draining grooves, respectively, of corresponding depth to drain the adjacent dish supporting surfaces of the bottom, the body being provided with a spout outlet at one end thereof with which said draining grooves connect, and said body being of a single unitary construction.

JOAN GRAY.